United States Patent
Friesen et al.

(10) Patent No.: US 10,005,599 B2
(45) Date of Patent: Jun. 26, 2018

(54) DISPENSER HAVING PIERCEABLE MEMBRANE

(71) Applicant: Bottlecap Holdings Ltd., Vancouver (CA)

(72) Inventors: Bradley Friesen, Vancouver (CA); Marcus Carius, Vancouver (CA); Alexander Trampolski, Eastvale, CA (US)

(73) Assignee: Bottlecap Holdings Ltd., Vancouver, British Columbia (CA)

( * ) Notice: Subject to any disclaimer, the term of this patent is extended or adjusted under 35 U.S.C. 154(b) by 354 days.

(21) Appl. No.: 14/784,013

(22) PCT Filed: Mar. 21, 2014

(86) PCT No.: PCT/CA2014/050300
§ 371 (c)(1),
(2) Date: Oct. 12, 2015

(87) PCT Pub. No.: WO2014/165983
PCT Pub. Date: Oct. 16, 2014

(65) Prior Publication Data
US 2016/0068319 A1 Mar. 10, 2016

Related U.S. Application Data

(60) Provisional application No. 61/810,978, filed on Apr. 11, 2013.

(51) Int. Cl.
*B65D 51/28* (2006.01)
*A47J 31/40* (2006.01)

(52) U.S. Cl.
CPC ........ *B65D 51/2835* (2013.01); *A47J 31/401* (2013.01)

(58) Field of Classification Search
CPC .............. B65D 51/222; B65D 51/225; B65D 51/2835; B65D 35/44; B65D 85/70;
(Continued)

(56) References Cited

U.S. PATENT DOCUMENTS

| 4,682,689 A | 6/1987 | Pereira et al. |
| 5,020,690 A | 6/1991 | Kishikawa et al. |

(Continued)

FOREIGN PATENT DOCUMENTS

| DE | 19950884 A1 | 4/2001 |
| FR | 2569666 A1 | 3/1986 |

(Continued)

OTHER PUBLICATIONS

International Search Report and Written Opinion of the International Searching Authority, dated Jul. 3, 2014, for corresponding International Application No. PCT/CA2014/050300, 17 pages.

(Continued)

*Primary Examiner* — Andrew Perreault
(74) *Attorney, Agent, or Firm* — Klarquist Sparkman, LLP

(57) ABSTRACT

A dispenser for dispensing material into a container has a base, which can be coupled to the container, and a rotatable portion that is mounted to the base and rotatable about an axis of rotation. The rotatable portion includes a storage compartment for storing the material. The storage compartment has a dispensing aperture of which at least a portion of the periphery extends in a direction non-perpendicular relative to the axis of rotation. The dispensing aperture is positioned such that the material stored in the storage compartment falls into the container when the dispensing aperture is uncovered. A pierceable membrane is sealed along the periphery of the dispensing aperture. A piercer, which forms part of the base, is offset from the axis of (Continued)

rotation and is positioned to pierce the membrane from the outside of the storage compartment during a full rotation of the rotatable portion.

20 Claims, 11 Drawing Sheets

(58) Field of Classification Search
CPC ..... B65D 2251/0015; B65D 2251/0093; A47J 31/401
USPC .......................................... 215/253; 206/222
See application file for complete search history.

(56) References Cited

U.S. PATENT DOCUMENTS

| | | |
|---|---|---|
| 6,138,821 A | 10/2000 | Hsu |
| 6,148,996 A | 11/2000 | Morini |
| 6,152,296 A | 11/2000 | Shih |
| 8,276,748 B2 | 10/2012 | Nyambi et al. |

FOREIGN PATENT DOCUMENTS

| | | |
|---|---|---|
| WO | WO2004/033336 A1 | 4/2004 |
| WO | WO2005/023667 A1 | 3/2005 |
| WO | WO2007/068094 A1 | 6/2007 |
| WO | WO2008/014541 A1 | 2/2008 |
| WO | WO2012/155249 A1 | 11/2012 |

OTHER PUBLICATIONS

International Preliminary Report on Patentability of the International Searching Authority, dated Aug. 14, 2015, for corresponding International Application No. PCT/CA2014/050300, 23 pages.

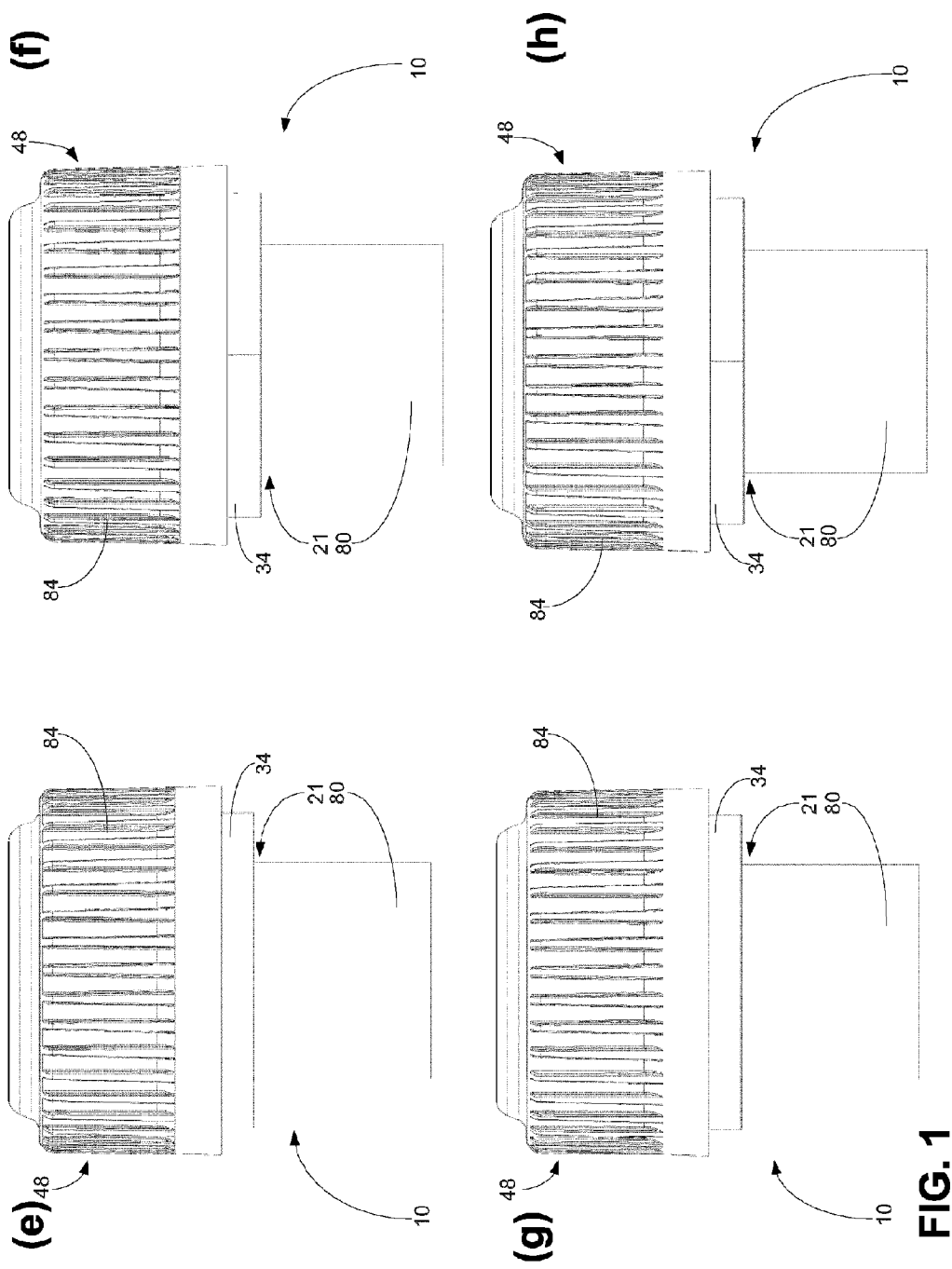

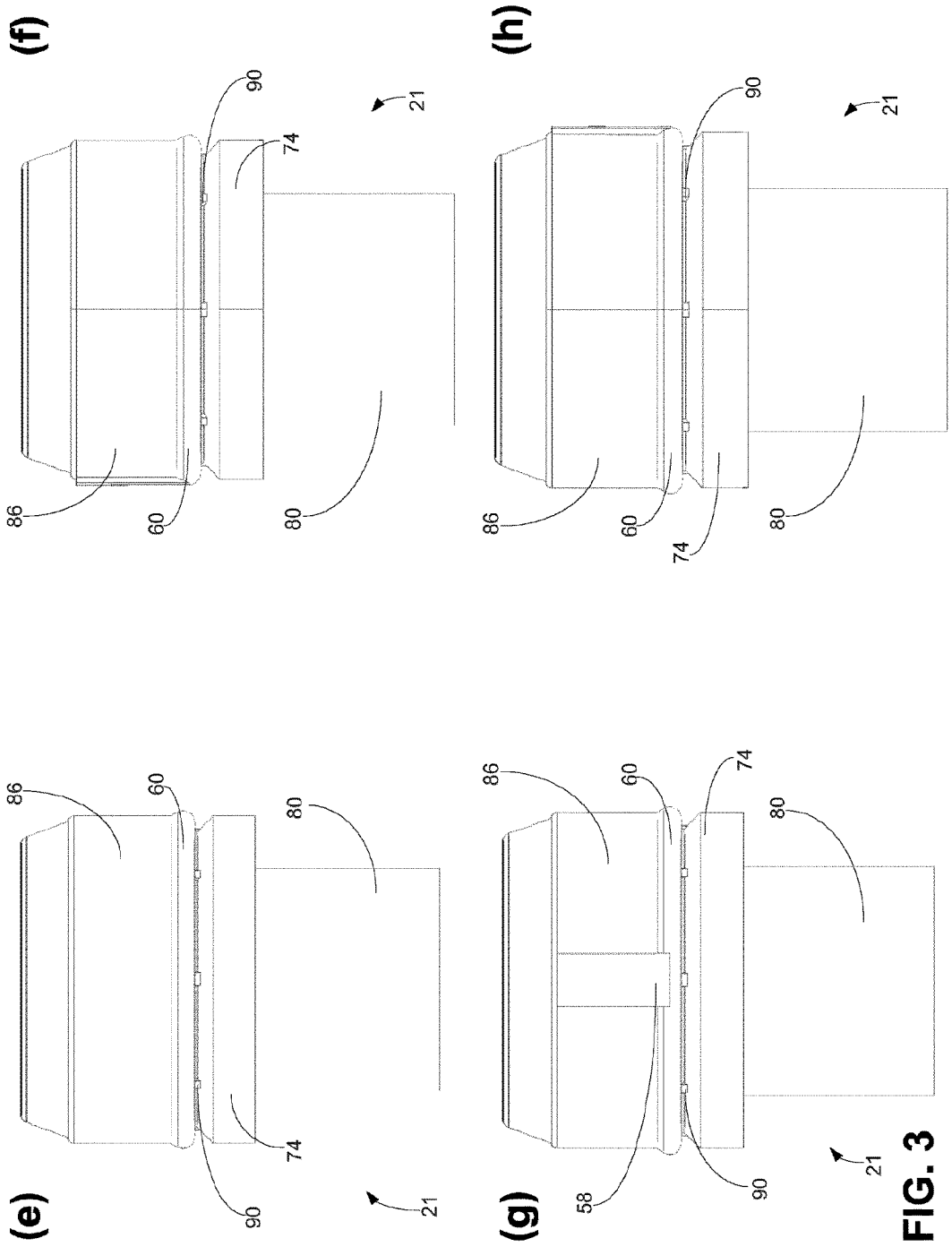

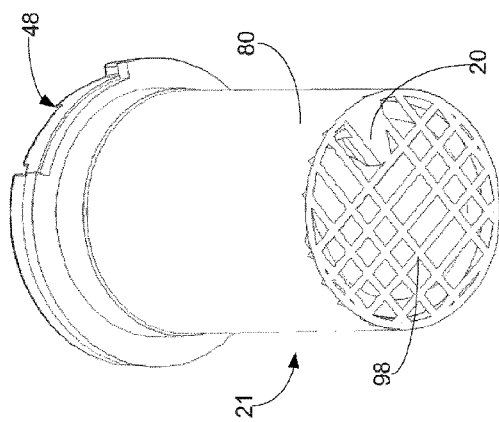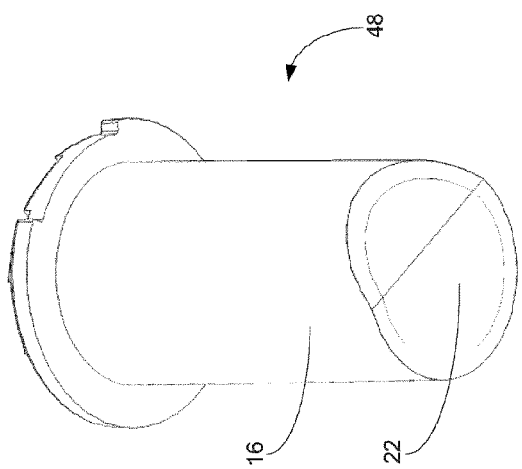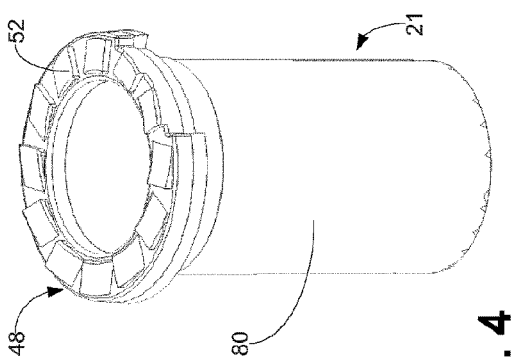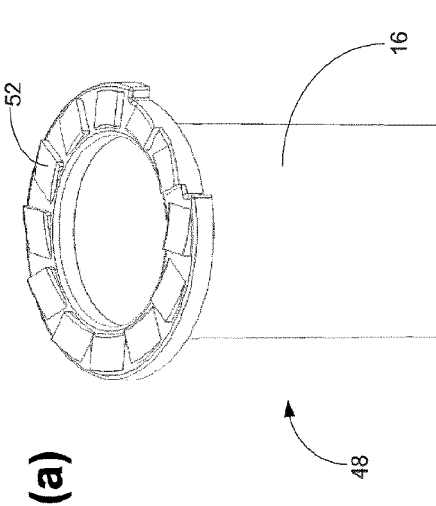
FIG. 4
FIG. 5

DISPENSER HAVING PIERCEABLE MEMBRANE

CROSS REFERENCE TO RELATED APPLICATIONS

This is the U.S. National Stage of International Application No. PCT/CA2014/050300, filed Mar. 21, 2014, which in turn claims the benefit of and priority to U.S. Provisional Application No. 61/810,978, filed Apr. 11, 2013.

TECHNICAL FIELD

The present disclosure is directed at a dispenser for dispensing material into a container. More particularly, the present disclosure is directed at a dispenser that has a pierceable membrane that is pierced to dispense the material into the container.

BACKGROUND

It can be useful, in a variety of contexts, to postpone creating a mixture comprising two materials until shortly prior to using the mixture. Examples of these contexts include when creating infused beverages comprising a mixture of powdered nutrients and a liquid; various types of cleaners (such as chemical and enzyme cleaners) comprising a mixture of an active cleaning ingredient and a liquid; and various medicines comprising a mixture of an active medicinal ingredient and a liquid. Accordingly, research and development continue into ways in which consumers can conveniently create a mixture comprising two materials shortly prior to using the mixture.

SUMMARY

According to a first aspect, there is provided a dispenser for dispensing material into a container that comprises a base, couplable to the container, comprising a piercer; and a rotatable portion mounted to the base and rotatable about an axis of rotation. The rotatable portion comprises a storage compartment for storing the material, the storage compartment comprising a dispensing aperture having a periphery of which at least a portion extends in a direction non-perpendicular relative to the axis of rotation, wherein the dispensing aperture is positioned such that the material stored in the storage compartment falls into the container when the dispensing aperture is uncovered; and a pierceable membrane sealed along the periphery of the dispensing aperture, wherein the piercer is offset from the axis of rotation and is positioned to pierce the membrane from the outside of the storage compartment during a full rotation of the rotatable portion.

The base may be threaded for screwing on to a neck of the container and the storage compartment may extend into the neck of the container.

The rotatable portion may rotate without moving along the axis of rotation.

The base may comprise a protective cylinder and the piercer may be attached to an end of the protective cylinder that is closest to the bottom of the container when the dispenser is on the container. The storage compartment may comprise an inner hollow cylinder, and the dispensing aperture may comprise an end of the inner hollow cylinder that is closest to the bottom of the container when the dispenser is on the container.

The inner hollow cylinder may be sheathed within the protective cylinder.

The base may further comprise a grid on the end of the protective cylinder to which the piercer is attached.

The end of the protective cylinder to which the piercer is attached may extend past the end of the inner hollow cylinder that comprises the dispensing aperture.

The portion of the periphery that extends in a direction non-perpendicular relative to the axis of rotation may lie in a plane that is oblique relative to the axis of rotation.

The entire periphery may lie in the plane that is oblique relative to the axis of rotation.

Another portion of the periphery may lie in a plane that is perpendicular to the axis of rotation.

The portions of the periphery that lie within the plane that is oblique relative to the axis of rotation and the plane that is perpendicular to the axis of rotation may comprise the entire periphery.

The base may further comprise a collar having a rim through which the storage compartment is inserted and wherein the rotatable portion further comprises a cap portion having an underside that rests on the rim.

The collar may comprise an outer curved surface having a ridge and an inner curved surface of the cap portion may have a slot sized to receive the ridge, wherein the ridge and slot are aligned parallel to the axis of rotation and positioned to avoid interfering with each other during rotation of the cap portion.

The inner curved surface may further comprise a stopper positioned to interfere with the ridge during rotation of the cap portion after the piercer has pierced the membrane.

One of the rim and the cap portion may comprise a dimple and the other of the rim and the cap portion may comprise a bump inserted into the dimple, wherein the bump and dimple resist rotation of the cap portion and are aligned with the ridge and the slot.

The base may further comprise a peg and a stopper circumferentially spaced from each other along the rim and that each extend from the rim towards the cap portion; and the cap portion may further comprise a hook-shaped protrusion shaped and positioned to be releasably couplable to the peg, wherein rotation of the hook-shaped protrusion from the peg to the stopper is sufficient to pierce the membrane.

The collar may comprise a first flange and the cap portion comprises a second flange interlocked with the first flange such that relative motion of the cap portion and the collar along the axis of rotation is prevented.

According to another embodiment, there is provided a dispenser for dispensing material into a container, the dispenser comprising: a base, screwable on to a neck of the container, and a rotatable portion mounted to the base and rotatable about an axis of rotation. The base comprises: a protective cylinder that extends into the neck of the container when the dispenser is screwed on to the container; and a piercer located along a periphery of an end of the protective cylinder that is closest to the bottom of the container when the dispenser is screwed on to the container. The rotatable portion comprises a storage compartment for storing the material, the storage compartment comprising: (1) an inner hollow cylinder sheathed by the protective cylinder; and (2) a dispensing aperture delineated by a periphery of an end of the inner hollow cylinder that is closest to the bottom of the container when the dispenser is screwed on to the container, wherein the periphery of the end of the inner hollow cylinder lies in one plane that is perpendicular to the axis of rotation and another plane that is oblique relative to the axis of rotation. The rotatable portion also comprises a pierceable membrane sealed along the periphery of the end of the inner hollow cylinder, wherein the piercer is adjacent a portion of the membrane that is oblique relative to the axis of rotation.

According to another embodiment, there is provided a dispenser for dispensing material into a container, the dispenser comprising a base and a rotatable portion. The base is couplable to the container and comprises: (i) a storage compartment for storing the material, the storage compartment comprising a non-planar dispensing aperture, wherein the dispensing aperture is positioned such that the material stored in the storage compartment falls into the container when the dispensing aperture is uncovered; and (ii) a pierceable membrane sealed along the periphery of the dispensing aperture. The rotatable portion is mounted to the base and rotatable about an axis of rotation, and comprises a piercer offset from the axis of rotation that is positioned to pierce the membrane from within the storage compartment during a full rotation of the rotatable portion.

The storage compartment may comprise an inner hollow cylinder and the piercer may be attached to an end of the inner hollow cylinder that is closest to the bottom of the container when the dispenser is on the container, and the base may comprise a protective cylinder and the dispensing aperture may comprise an end of the protective cylinder that is closest to the bottom of the container when the dispenser is on the container.

The dispensing aperture may lie in a one plane that is oblique relative to the axis of rotation and another plane that is perpendicular to the axis of rotation.

According to another embodiment, there is provided an assembly for use in manufacturing a dispenser for dispensing material into a container, the assembly comprising: a base, couplable to the container, comprising a piercer; and a rotatable portion mounted to the base and rotatable about an axis of rotation, the rotatable portion comprising a storage compartment for storing the material, the storage compartment comprising a dispensing aperture having a periphery of which at least a portion extends in a direction non-perpendicular relative to the axis of rotation, wherein the dispensing aperture is positioned such that the material stored in the storage compartment falls into the container when the dispensing aperture is uncovered and wherein the piercer is offset from the axis of rotation and is positioned to pierce a membrane sealed along the periphery of the dispensing aperture from the outside of the storage compartment during a full rotation of the rotatable portion.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more exemplary embodiments:

FIGS. 4(a)-(b) are top and bottom perspective views of a rotatable portion and a base of a dispenser according to another embodiment.

FIGS. 5(a)-(b) are top and bottom perspective views of the rotatable portion of FIGS. 4(a)-(b).

DETAILED DESCRIPTION

Figure 1:
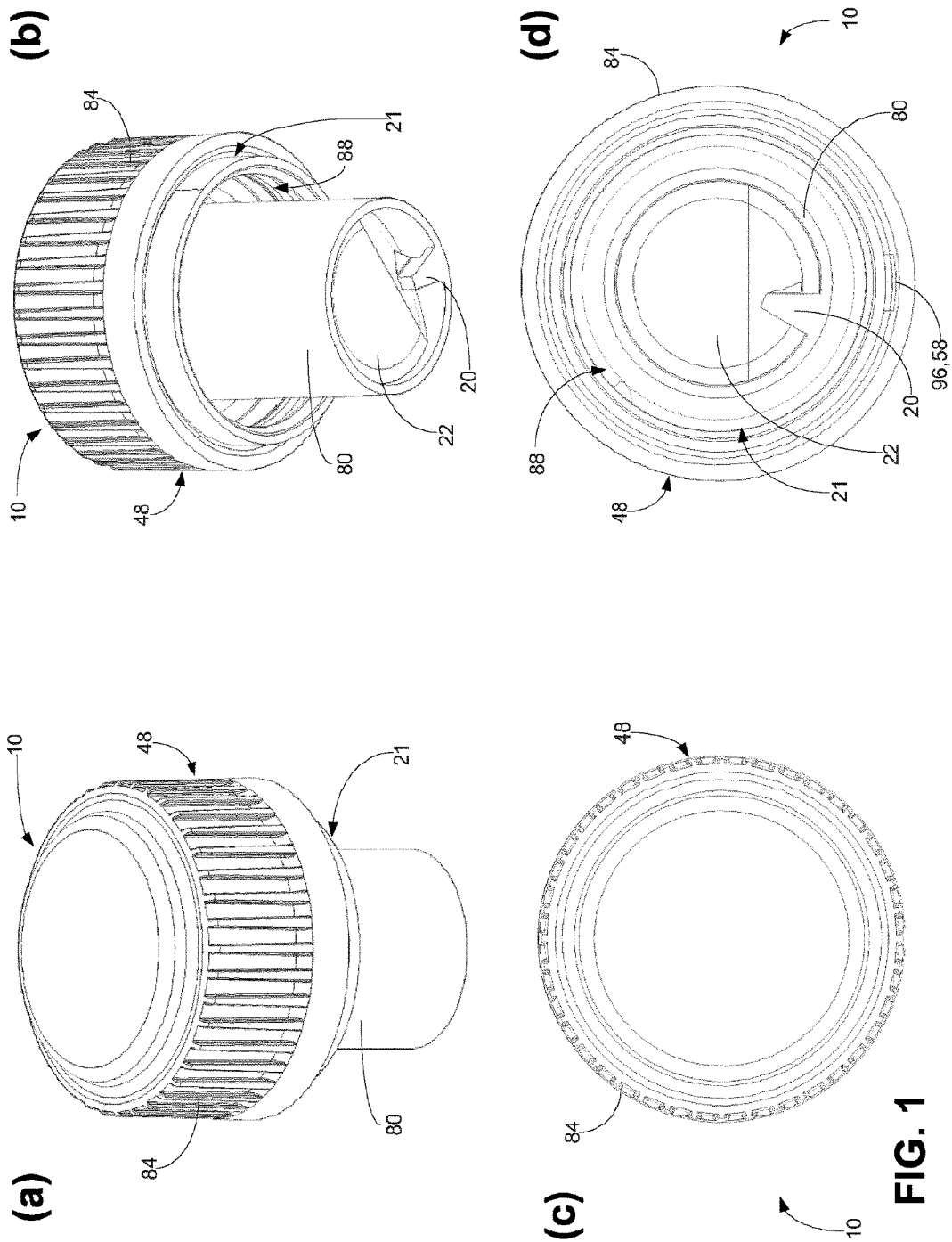
FIGS. 1(a)-(h) are top perspective, bottom perspective, top plan, bottom plan, front elevation, left side elevation, rear elevation, and right side elevation views of a dispenser comprising a rotatable portion and a base, according to one embodiment.
Figure 2:
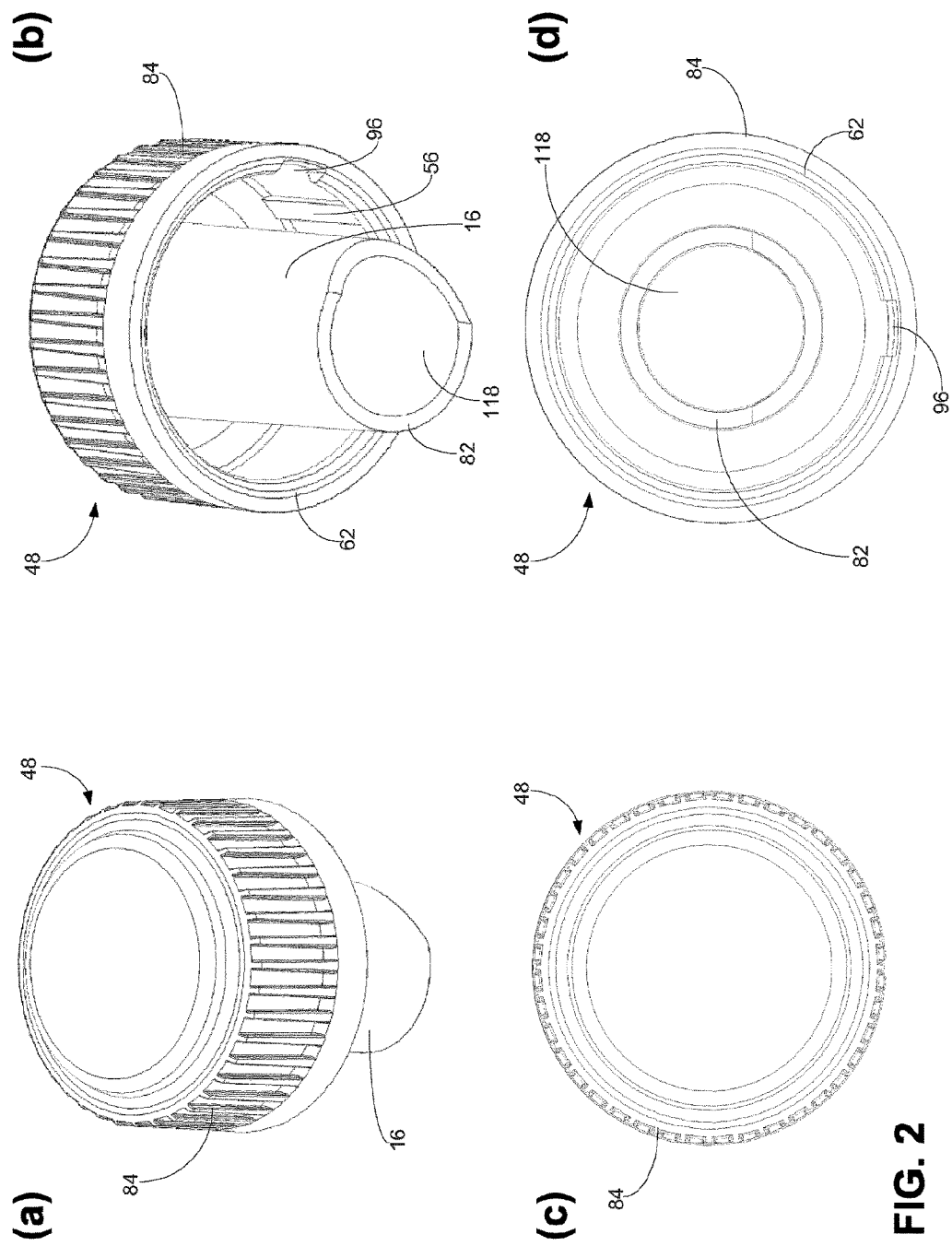
FIGS. 2(a)-(h) are top perspective, bottom perspective, top plan, bottom plan, front elevation, left side elevation, rear elevation, and right side elevation views of the rotatable portion of the dispenser of FIGS. 1(a)-(h).
Figure 2:
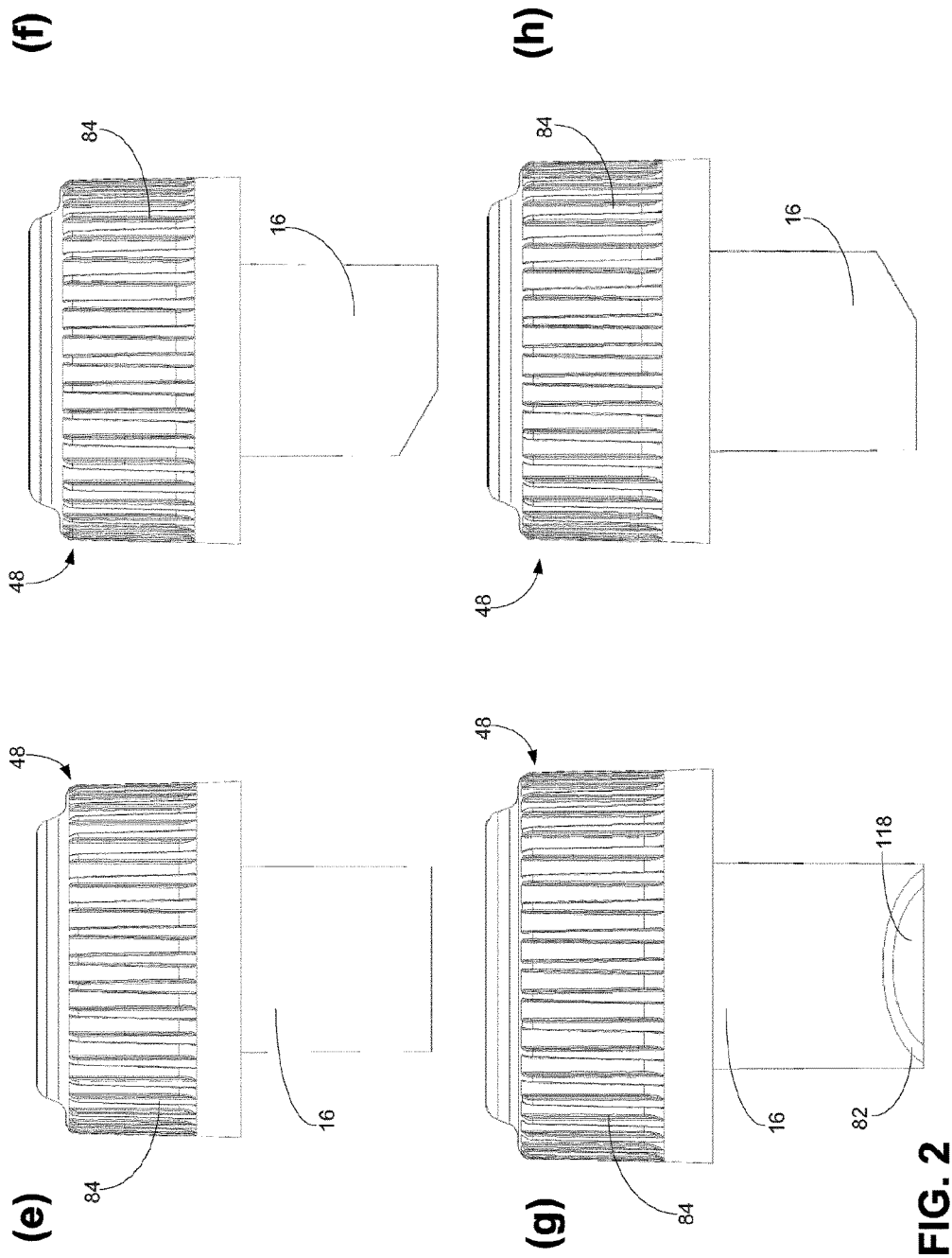
Figure 3:
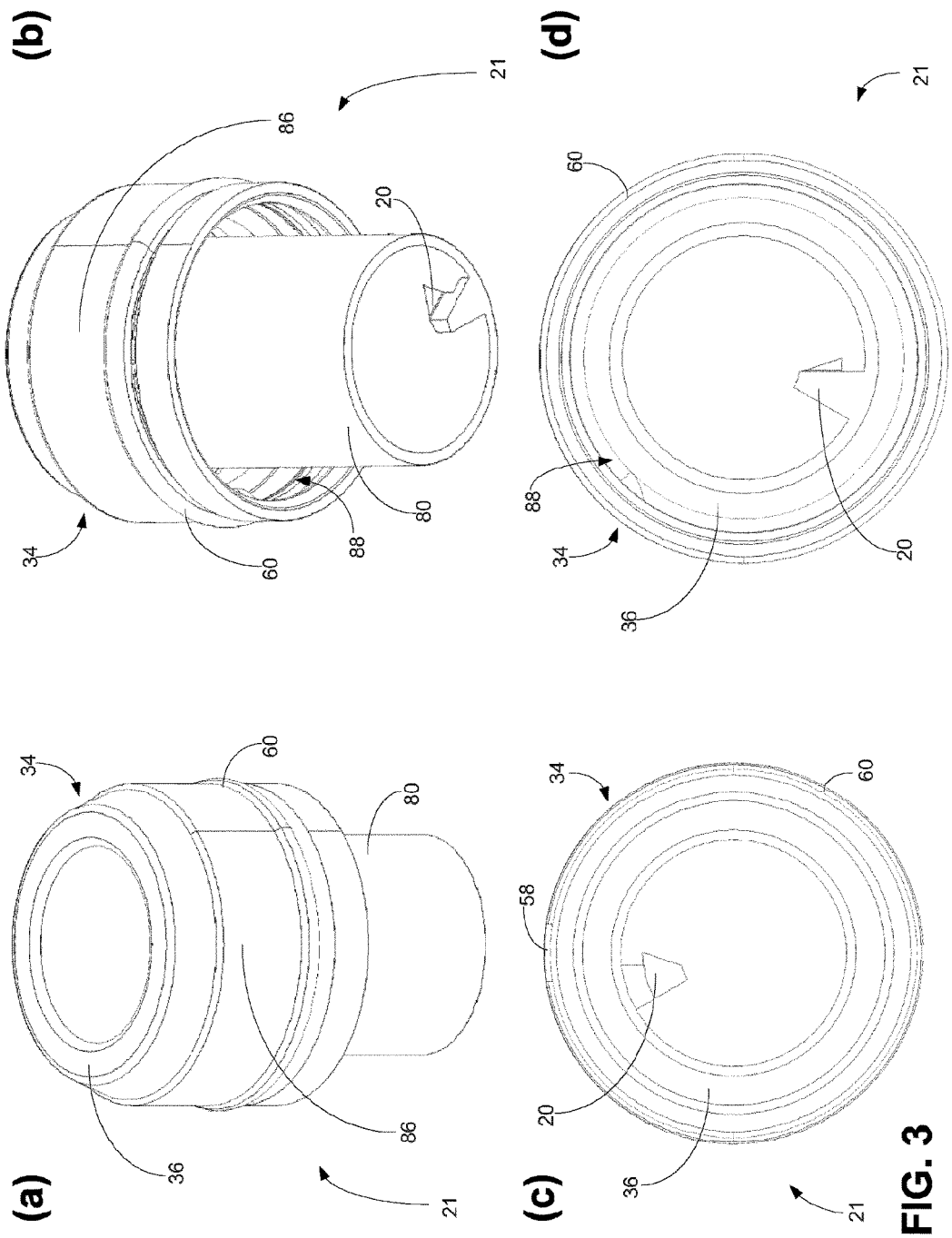
FIGS. 3(a)-(h) are top perspective, bottom perspective, top plan, bottom plan, front elevation, left side elevation, rear elevation, and right side elevation views of the base of the dispenser of FIGS. 1(a)-(h).

Directional terms such as "top," "bottom," "upwards," "downwards," "vertically," and "laterally" are used in the following description for the purpose of providing relative reference only, and are not intended to suggest any limitations on how any article is to be positioned during use, or to be mounted in an assembly or relative to an environment.

Increasingly, people are supplementing their diets with beverages infused with some form of nutrients ("infused beverages"). Such beverages include, for example, water that has dissolved in it vitamins or other antioxidants, and protein drinks. In response to demand for infused beverages beverage producers have begun producing and selling infused beverages to consumers.

One problem encountered in producing and selling infused beverages is maintaining the potency of dissolved nutrients. For example, some vitamins and antioxidants oxidize and lose their effectiveness in water over time, which is detrimental to product shelf life. Similarly, some dissolved proteins tend to turn rancid over time. In order to overcome this problem, the nutrients and the liquid can be kept separate until the consumer is ready to drink the infused beverage. For example, the nutrients may be kept separately from the liquid in powdered form such that they can be stored indefinitely. When the consumer is ready to drink the infused beverage, he or she can dispense the powdered nutrients into the liquid and then drink.

The powdered nutrients can conventionally be dispensed into the container in several ways. For example, the powdered nutrients may be stored in the cap of the container and dispensed into the container by pushing the cap along the container's longitudinal axis. This is cumbersome, however, in that pushing the cap is not how to open the container. Consequently, people may remove the cap from the container (e.g.: by unscrewing it) only to annoyingly discover that they have not dispensed the powdered nutrients.

While some caps dispense the powdered nutrients into the container in response to being unscrewed, these caps typically do so by torquing and bending a lever arm to pierce a foil membrane in response to unscrewing. This can be problematic in that bending the lever arm deforms it, and consequently increases the likelihood the lever arm will break; this prejudices the robustness and reusability of such caps. Furthermore, the lever arm may be positioned such that using gaskets to seal the cap is difficult.

Infused beverages are one type of mixture for which it can be useful to postpone creation of the mixture to shortly prior to its use. It can be useful to do this with some other mixtures as well. For example, postponing mixing of a powdered medicine can be useful to prevent degradation or spoiling of the active medicinal ingredient, which may occur more quickly when the powdered medicine is mixed with a liquid.

Similarly, refills of cleaning products may be sold in concentrated solid (powdered) or liquid form, to be mixed with water by the consumer prior to use (these concentrated refills are hereinafter "refill cleaning products"). Mixing the cleaning products with water at a factory or distribution centre would result in the product being shipped in a liquid filled container, which is less environmentally friendly to produce and more expensive to ship than the small packages that can be used to ship an equivalent amount of cleaning product in concentrated form. Consequently, in the example of refill cleaning products, postponing mixing the concentrated refill with water until the consumer has purchased and is ready to use the cleaning product can have environmental and economic benefits.

The embodiments described herein are directed at a dispenser for dispensing material, such as powdered nutrients or concentrated cleaning products, into a container. The dispenser can be used in place of a typical container cap. Depending on whether the consumer is expected to screw the dispenser on to the container, the dispenser is designed to automatically dispense the material into the container in response either to the consumer's normal cap screwing or unscrewing motion. Following dispensing, unscrewing the dispenser from the container allows the liquid contained within the container to be poured or drunk, or allows a different dispenser (such as a spray nozzle) to be placed on the container, as appropriate. The dispenser comprises a pierceable membrane such as a piece of foil to seal the dispenser's storage compartment, which can help to ensure the material stays fresh.

Referring now to FIGS. 1(a)-(h), there are respectively shown top perspective, bottom perspective, top plan, bottom plan, front elevation, left side elevation, rear elevation, and right side elevation views of a dispenser 10 manufactured from a rotatable portion 48 mounted to a base 21, according to one embodiment. FIGS. 2(a)-(h) respectively depict top perspective, bottom perspective, top plan, bottom plan, front elevation, left side elevation, rear elevation, and right side elevation views of the rotatable portion 48, and FIGS. 3(a)-(h) respectively depict top perspective, bottom perspective, top plan, bottom plan, front elevation, left side elevation, rear elevation, and right side elevation views of the base 21. The dispenser 10 in FIGS. 1(a)-(h) is shown in a closed position in which the material is stored within a storage compartment 16 that forms part of the rotatable portion 48. The dispenser 10 is screwed on to the container in this closed position. As discussed in further detail below, the consumer begins to unscrew the dispenser 10 just as he or she would unscrew a conventional screw-on cap, which causes the dispenser 10 to transition from the closed position to a dispensing position in which the material stored in the storage compartment 16 falls into the container.

Referring in particular to FIGS. 2(a)-(h), the rotatable portion 48 includes a cap portion 84 whose exterior is ribbed to help the consumer grip it and to assist with dispenser manufacturing. The cap portion 84 is integrally formed with the storage compartment 16 that in the depicted embodiment is in the form of an inner hollow cylinder extending downwardly from the cap portion 84's underside. At a bottom end of the storage compartment 16, which is the end of the compartment 16 that is nearest the bottom of the container when the dispenser is on the container, is a dispensing aperture 118 through which material stored in the storage compartment 16 falls when the material is dispensed into a container. The dispensing aperture 118 is bounded by a periphery 82; as used herein, the "dispensing aperture 118" refers to a surface bounded by the periphery 82. A portion of the periphery 82 extends in a direction non-perpendicular relative to the axis of rotation; a corresponding portion of the dispensing aperture 118 is accordingly non-perpendicular relative to the axis of rotation. In the depicted embodiments, approximately 60% of the periphery 82 lies in a plane that is perpendicular to the axis of rotation (the "perpendicular plane") with the remaining portion of the periphery 82 lying in a plane that is oblique relative to the axis of rotation (the "oblique plane"). The dispensing aperture 118 consequently lies in the perpendicular and oblique planes. When the dispenser 10 is in use and before the material stored in the storage compartment is dispensed, a pierceable membrane such as a layer of foil 22 (not shown in FIGS. 2(a)-(h), but shown in FIGS. 1(b) and (d)) is sealed along the periphery 82 and consequently overlaps with and closes the dispensing aperture 118. In an alternative embodiment (not depicted), the pierceable membrane may be a material other than the foil 22, such as a recyclable plastic film.

Referring now to FIGS. 3(a)-(h), the base 21 includes a collar 34 formed from a substantially cylindrical body 86 and a protective cylinder 80 that extends downwardly from an underside of the body. The body 86 and the protective cylinder 80 are positioned concentrically relative to each other. Between the protective cylinder 80 and the curved wall of the body 86 is an annular portion 88 into which the neck of the container is inserted when the dispenser 10 is screwed on to the container. The inside of the body 86's curved wall is accordingly threaded to allow it to be screwed on to the container. At the bottom of the body 86 is a frangible connection 90 above a ring 74 that is secured under a flange at the bottom of the neck of the container when the dispenser 10 is on the container; the ring 74 and frangible connection 90 accordingly prevent axial movement of the base 21 relative to the container until the consumer unscrews the dispenser 10 and breaks the frangible connection 90, as described further below.

At the top end of the collar 34 is a rim 36, which covers the top of the annular portion 88 and which connects the top of the curved wall of the body 86 to the top of the protective cylinder 80. The remainder of the top end of the body 86 is left open, which allows the interior of the protective cylinder 80 to be accessed through the top of the body 86.

At the bottom end of the protective cylinder 80 is a piercer 20, pointing upwards, that is offset from the axis of rotation and, as discussed in more detail bellow, is positioned to pierce the foil 22 from the outside of the storage compartment during a full rotation of the rotatable portion 48.

A ridge 58 protrudes from the outer surface of the curved wall of the body 86, and a slot 96 sized slightly wider than the ridge 58 is present on the bottom of an inner curved surface of the cap portion 84. The ridge 58 and slot 96 are used to suitably position the rotatable portion 48 and the base 21 relative to each other during assembly of the dispenser 10. As shown in FIGS. 1(b) and (d), when the material is stored in the storage compartment 16 and the dispenser 10 is assembled, a portion of the piercer 20 is contained within an ungula above the perpendicular plane and below the oblique plane. The ridge 58 and slot 96 are consequently aligned relative to the piercer 20 so that the piercer 20 is so positioned when the rotatable portion 48 is mounted on to the base 21; by "mounted on to the base 21", it is meant that the rotatable portion 48 is slid on to the base 21 until the rim 36 and the underside of the cap portion 84 touch. The slot 96 is positioned near the bottom of the cap portion 84 and the ridge 58 does not extend to the bottom of the collar 34 so that when the rotatable portion 48 is mounted on the base 21, the slot 96 and ridge 58 do not interfere to prevent relative rotation of the rotatable portion 48 and the base 21.

The outer curved surface of the collar 34 and the inner curved surface of the cap portion 84 have respectively protruding from them a first flange 60 and a second flange 62. When the ridge 58 and slot 96 are aligned and the rotatable portion 48 is mounted on to the base 21, the flanges 60,62 are forced past each other and elastically deform while doing so. Once the flanges 60,62 have been forced past each other, they return to their initial positions and interlock, which prevents relative movement of the rotatable portion 48 and base 21 along the axis of rotation.

The inner curved surface of the cap portion 84 also includes a stopper 56 that protrudes inwards. When the rotatable portion 48 is mounted on to the base 21, the rotatable portion 48 is rotatable on and relative to the base 21 in either clockwise or counterclockwise directions until it is sufficiently rotated that the stopper 56 contacts the ridge 58; when this contact is made, further relative rotation in the direction that precipitated the contact is prevented.

Referring again to FIGS. 1(a)-(h), the assembled dispenser 10 is shown. To assemble the dispenser 10, the rotatable portion 48 and the base 21 are first manufactured by, for example, injection molding using a thermoplastic. The rotatable portion 48 is molded as shown in FIGS. 2(a)-(h), while the base 21 is manufactured as shown in FIGS. 3(a)-(h). The storage compartment 16 is subsequently filled with the material to be dispensed, such as a vitamin powder or concentrated cleaner, through the dispensing aperture 118. After filling the storage compartment 16 the foil 22 is sealed to the periphery 82 of the bottom of the storage compartment 16, which closes the dispensing aperture 118. Sealing the periphery 82 using the foil 22 hermetically seals the storage compartment 16. The ridge 58 on the collar 34 and the slot 96 on the cap portion 84 are then aligned, and the rotatable portion 48 is mounted on to the base 21 by sliding the rotatable portion 48 on to the base 21 until the underside of the cap portion 84 is flush against the rim 36.

In an alternative embodiment (not depicted), the pierceable membrane may comprise molding flash generating during injection molding of the rotatable portion 48. In this alternative embodiment, the rotatable portion 48 may be molded in two parts: a first part that is identical to the rotatable portion 48 shown in FIGS. 2(a)-(h) except (i) it includes the pierceable membrane in the form of molding flash and (ii) a lid, which covers at least a portion of the top of the storage compartment 16, is missing from the top of the cap portion 84; and the lid itself. The base 21 is manufactured as shown in FIGS. 3(a)-(h). The storage compartment 16 is subsequently filled with the material to be dispensed through the top of the cap portion 84. Following filling the lid is ultrasonically welded to the top of the storage compartment 16 and the cap portion 84, which hermetically seals the storage compartment 16. The ridge 58 on the collar 34 and the slot 96 on the cap portion 84 are then aligned, and the rotatable portion 48 is mounted on to the base 21 by sliding the rotatable portion 48 on to the base 21 until the underside of the cap portion 84 is flush against the rim 36.

In one alternative embodiment (not depicted), aligned with the ridge 58 and the slot 96 are a bump located on one of the rim 36 and the underside of the cap portion 84 and a dimple on the other of the rim 36 and the underside of the cap portion 84. When the rotatable portion 48 is mounted on to the base 21, the bump fits within the dimple, which prevents relative rotational motion of the rotational portion 48 and the base 21 until the consumer intentionally torques the rotational portion 48 counterclockwise to unscrew the dispenser 10. In alternative embodiments (not depicted), the resistance provided by the bump and dimple may be provided by shrink wrap or a foil sleeve wrapped on the exterior of the dispenser 10.

The storage compartment 16 is sheathed within the protective cylinder 80 in the assembled dispenser 10, and the end of the protective cylinder 80 to which the piercer 20 is attached extends past the end of the storage compartment 16 that comprises the dispensing aperture 118. This portion of the protective cylinder 80 that overhangs the storage compartment 16 helps protect the foil 22 from being damaged during mass production of the dispenser 10. When many of the dispensers 10 are assembled and stored in a bin, the overhanging portion of the protective cylinder 80 protects the foil 22 from being impacted and torn by the other dispensers 10 in the bin.

Once assembled and filled, the dispenser 10 can be screwed on to the neck of the container and is subsequently ready to be opened by the consumer. When the consumer is ready to dispense the material into the container, the consumer grips the cap portion 84 and rotates the cap portion 84 counterclockwise, just as he or she would do if unscrewing a conventional bottle cap. However, when unscrewing the dispenser 10, the consumer's initial rotation rotates the rotatable portion 48 counterclockwise relative to the base 21 until the stopper 56 and the ridge 58 collide. As the rotatable portion 48 and the base 21 rotate relative to each other, the foil 22 is driven into, pierced, and torn open by the piercer 20. The material subsequently falls into the container.

Once the ridge 58 and the stopper 56 collide the rotatable portion 48 and the base 21 cease their relative rotation, and the torque applied by the consumer is transferred to the base 21 and is used to unscrew the base 21 from the container. The unscrewing motion breaks the frangible connection 90 at the bottom of the base 21, following which the consumer can lift the dispenser 10 off the container and drive the infused beverage.

Figure 6:
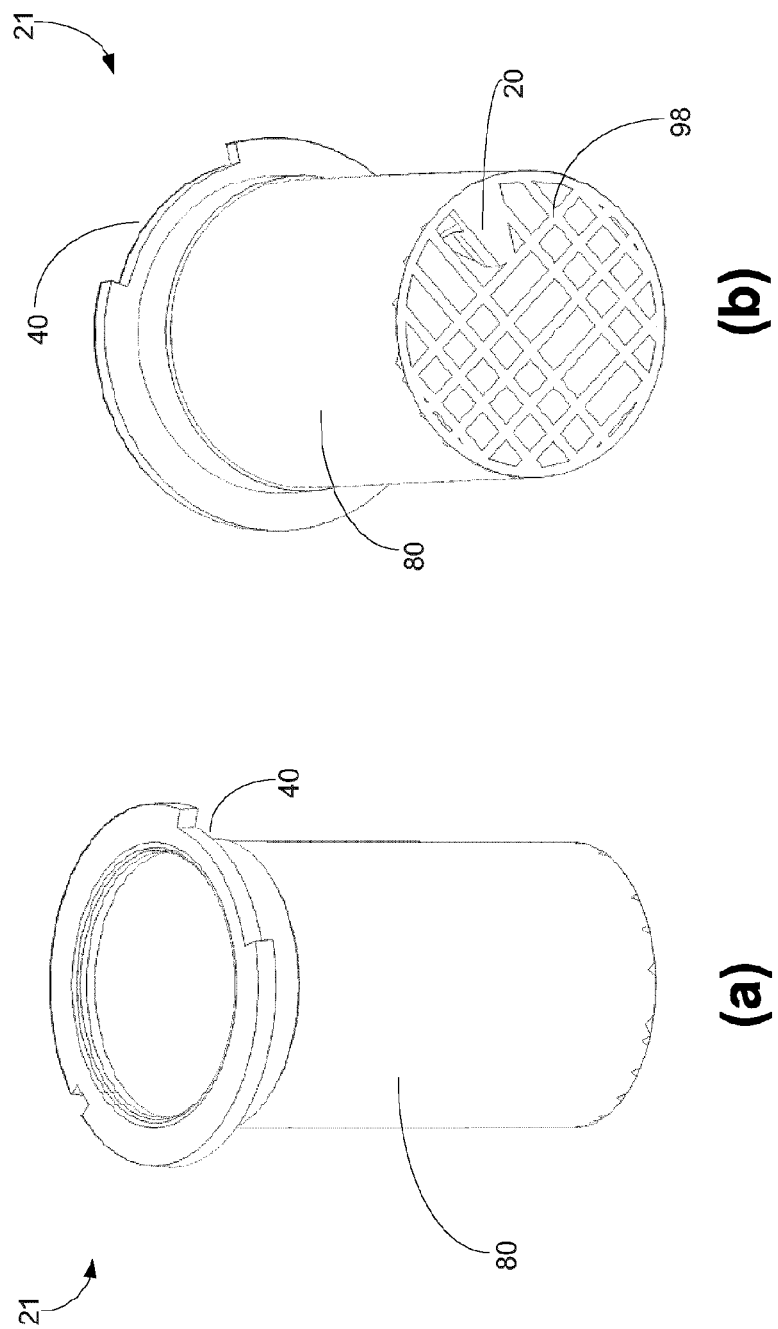
FIGS. 6(a)-(b) are top and bottom perspective views of the base of FIGS. 4(a)-(b).

Referring now to FIGS. 4(a) and (b), there are respectively shown top and bottom perspective views of the rotatable portion 48 and the base 21 of the dispenser 10 according to another embodiment. FIGS. 5(a) and (b) respectively show top and bottom perspective views of the rotatable portion 48, and FIGS. 6(a) and (b) respectively show top and bottom perspective views of the base 21. As in the embodiment of FIGS. 1 through 3, the base comprises the protective cylinder 80; the rotatable portion 48 comprises the storage compartment 16 in the form of the inner hollow cylinder; the storage compartment 16 is sheathed within the protective cylinder 80; the storage compartment 16 rests on the base 21; and the dispensing aperture 118 and foil 22 lie entirely in the perpendicular and oblique planes. Unlike the embodiment of FIGS. 1 through 3, the rotatable portion 48 and base 21 shown in FIGS. 4 through 6 are designed to be used in a four part dispenser in which the cap portion 84 and collar 34 are not integrally molded with the storage compartment 16 and the base 21, respectively, such as the dispenser described in PCT patent application PCT/CA2012/000468 having publication number WO 2012/155249, the entirety of which is hereby incorporated by reference herein. The top of the rotatable portion 48 accordingly has a set of teeth 52 for interfacing with pawls (not shown) on the underside of the cap portion 84, and the protective cylinder 80 has a notch 40 for receiving a U-shaped protrusion (not shown) on the rim 36 of the collar 34 to prevent relative rotation of the protective cylinder 80 and the collar 34.

The protective cylinder 80 shown in FIGS. 4 and 6 also has a grid 98 on the bottom end to which the piercer 20 is attached. The grid 98 helps to prevent the foil 22 from falling into the container after it has been torn open. Instead of using the grid 98, the foil 22 may be laminated to prevent small pieces of it from being torn off and falling into the container. In an alternative embodiment (not shown), the grid 98 may be replaced with a solid wall positioned beneath the slanted portion of the foil 22 to act as a guard to prevent pieces of the foil 22 from falling into the container. The piercer 20 is plow-shaped to assist in clearing of the torn foil 22 from the dispensing aperture 118 so that the material in the storage compartment 16 has a clear path along which to fall into the container.

In an embodiment in which the dispenser 10 stores material in the form of powdered nutrients, the dispenser 10 described above allows the consumer to wait until just before he or she wishes to drink the infused beverage to introduce the material to the liquid in the container. This limits the degradation of the nutrients that can occur, thus helping to maintain nutrient potency.

Although one particular embodiment has been depicted and described, alternative embodiments are possible. For example, in one alternative embodiment (not shown) the dispenser 10 may include one or both of a collar gasket and a cover gasket. The collar gasket is located on the underside of the rim 36 of the collar 34 such that when the collar 34 is screwed on to the neck of the container, the collar gasket is compressed between the collar 34 and the neck. The collar gasket helps create a fluid tight seal between the collar 34 and the container, which can prevent liquid from escaping between the collar 34 and the container when the container is shaken.

Optionally, a rotatable portion gasket (not shown) can line the boundary between the rotatable portion 48 and base 21 to prevent liquid from escaping between these two components, if desired.

In the foregoing embodiments, the rotatable portion 48 rotates without moving longitudinally along its axis of rotation. For the rotatable portion 48 to move along its axis of rotation in response to rotation, a relatively complex gear arrangement would typically be used, or the material used to fabricate the rotatable portion 48 would deform in some way. Both of these ways of introducing axial movement increase the cost and complexity of the dispenser 10.

The cap portion 48 in the embodiments discussed above conceals from the consumer the portion of the collar 34 that is above the frangible connection 90. For the collar 34, the cap portion 48 conceals the entire collar 34 except for the ring 74, which cannot rotate counterclockwise because of the one-way coupling between it and the neck of the container. Because the collar 34 is concealed, when the consumer goes to unscrew the dispenser 10 he or she will only grab and twist the cap portion 48, thereby dispensing the material into the container while unscrewing the dispenser 10. This prevents the consumer from inadvertently unscrewing the dispenser 10 without having dispensed the material into the container.

In alternative embodiments (not depicted), the protective cylinder 80 may be replaced with a protective element having a non-circular cross-section, such as a polygonal (e.g.: square, rectangle, etc.) shaped cross-section. In order to allow the rotatable portion 48 to rotate within the base 21, the radius of rotation swept out by the inner hollow cylinder can be made small enough to lie entirely within the open volume within the protective element.

The storage compartment 16 of the depicted embodiments extends down the neck of the container. In alternative embodiments (not shown), the storage compartment 16 may be located in a different location. For example, the storage compartment 16 may extend upwards and away from the interior of the container. Alternatively, the storage compartment 16 may be located around the axis of rotation and have one or more dispensing apertures 118 that are parallel to the axis of rotation. In this alternative embodiment, the bottom of the storage compartment 16 is slanted towards the axis of rotation to allow the material to slide out the dispensing aperture 118 when the foil 22 is gone.

While in the depicted embodiments the dispensing aperture 118, and consequently the foil 22, lie entirely in the perpendicular and oblique planes, in alternative embodiments this need not be the case. So long as a portion of the periphery 82 extends in a direction non-perpendicular relative to the axis of rotation and, consequently, a portion of the dispensing aperture 118 and foil 22 are non-perpendicular relative to the axis of rotation, the piercer 20 can be positioned 1) offset from the axis of rotation and 2) between the foil 22 and a plane that is perpendicular to the axis of rotation and that includes the bottom of the dispensing aperture 118, and as shown in FIGS. 1 through 6 optionally adjacent to or in contact with the foil 22, which results in the piercer 20 piercing the foil 22 upon a full 360° rotation of the rotatable portion 48 about the axis of rotation.

In another alternative embodiment (not depicted), the piercer 20 may be placed inside the storage compartment 16. In this alternative embodiment, the rotatable portion 48 comprises the piercer and the base 21 comprises the storage compartment 16. The dispensing aperture 118 may be planar (i.e. lying entirely in one plane) or, as depicted in the embodiments of FIGS. 1 through 6, may be non-planar (i.e. comprise multiple portions of which at least one extends in a direction non-perpendicular relative to the axis of rotation).

In another alternative embodiment (not depicted), the piercer 20 may comprise part of the container. In this alternative embodiment, the piercer 20 is connected to a support that is attached to an interior surface of the container and that extends inwardly towards the axis of rotation from the interior surface of the container. The support extends beneath the dispensing aperture 118. The piercer 20 is attached to a portion of the support that is beneath the dispensing aperture 118 and extends upwardly to a position at which it can pierce the foil 22 upon a complete rotation of the rotatable portion 48 about the axis of rotation.

The embodiments depicted in FIGS. 1 to 6 depict embodiments of the dispenser 10 in which the consumer rotates the cap portion 84 counter-clockwise in order to dispense the material into the container and in order to unscrew the dispenser 10 from the container. These embodiments are typically used when the consumer purchases the dispenser 10 already screwed on to the container and the consumer's natural inclination is simply to unscrew the dispenser 10 in order to access the liquid within the container. The dispenser 10 of FIGS. 1 to 6 will dispense the material into the container while the consumer is rotating the cap portion 84 counter-clockwise, thus providing an intuitive way to dispense the material into the container.

Figure 7A:
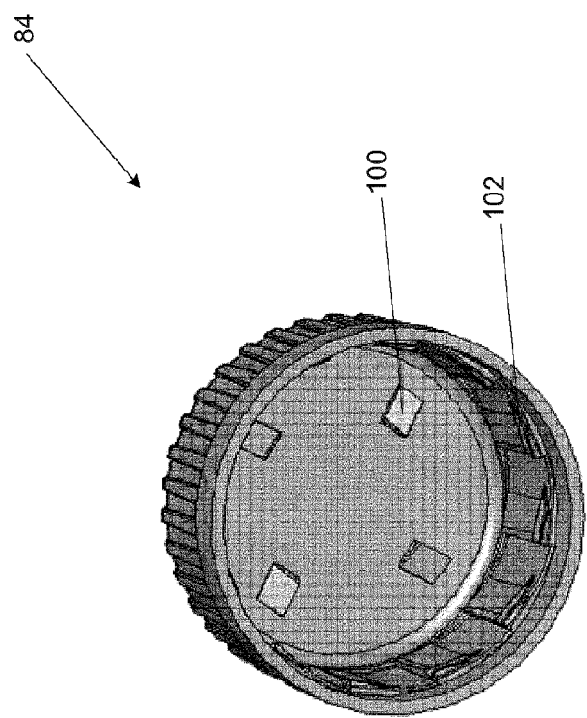
FIGS. 7(a)-(c) are perspective views of components that comprise another embodiment of the dispenser.
Figure 7B:
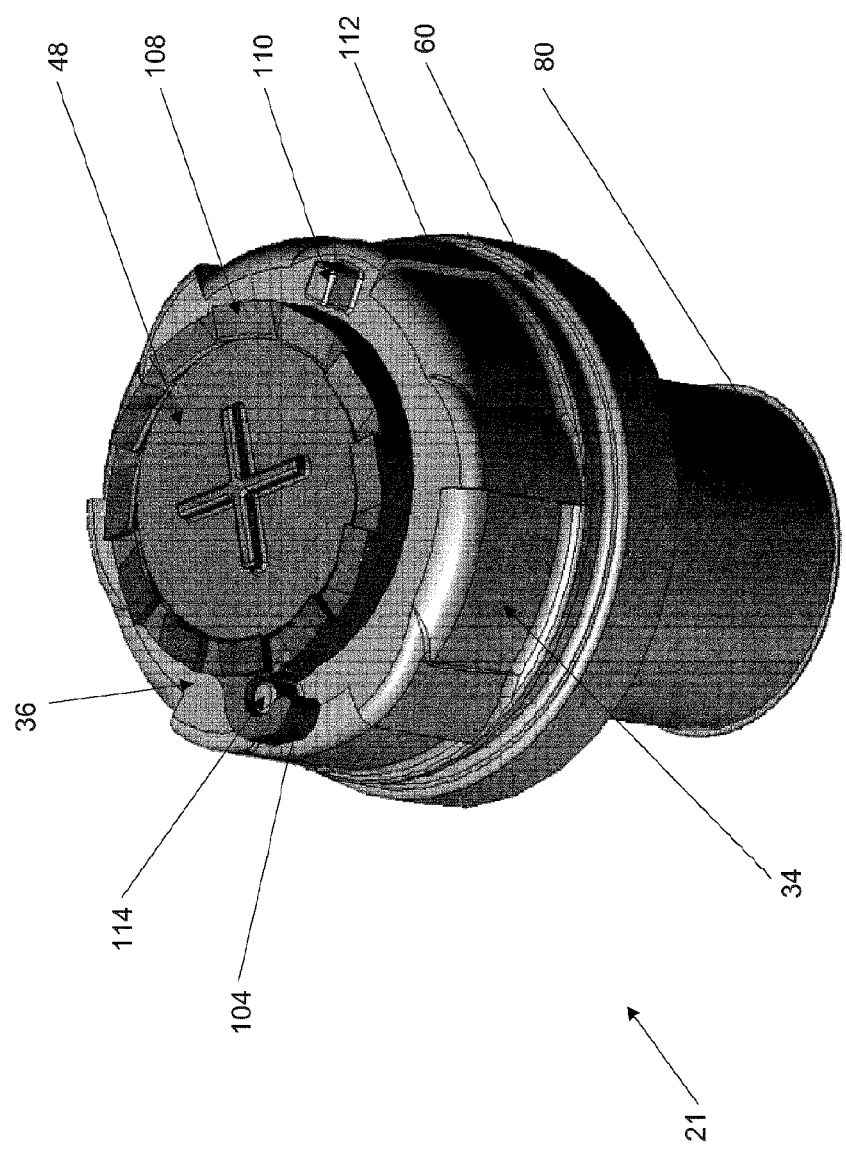
Figure 7C:
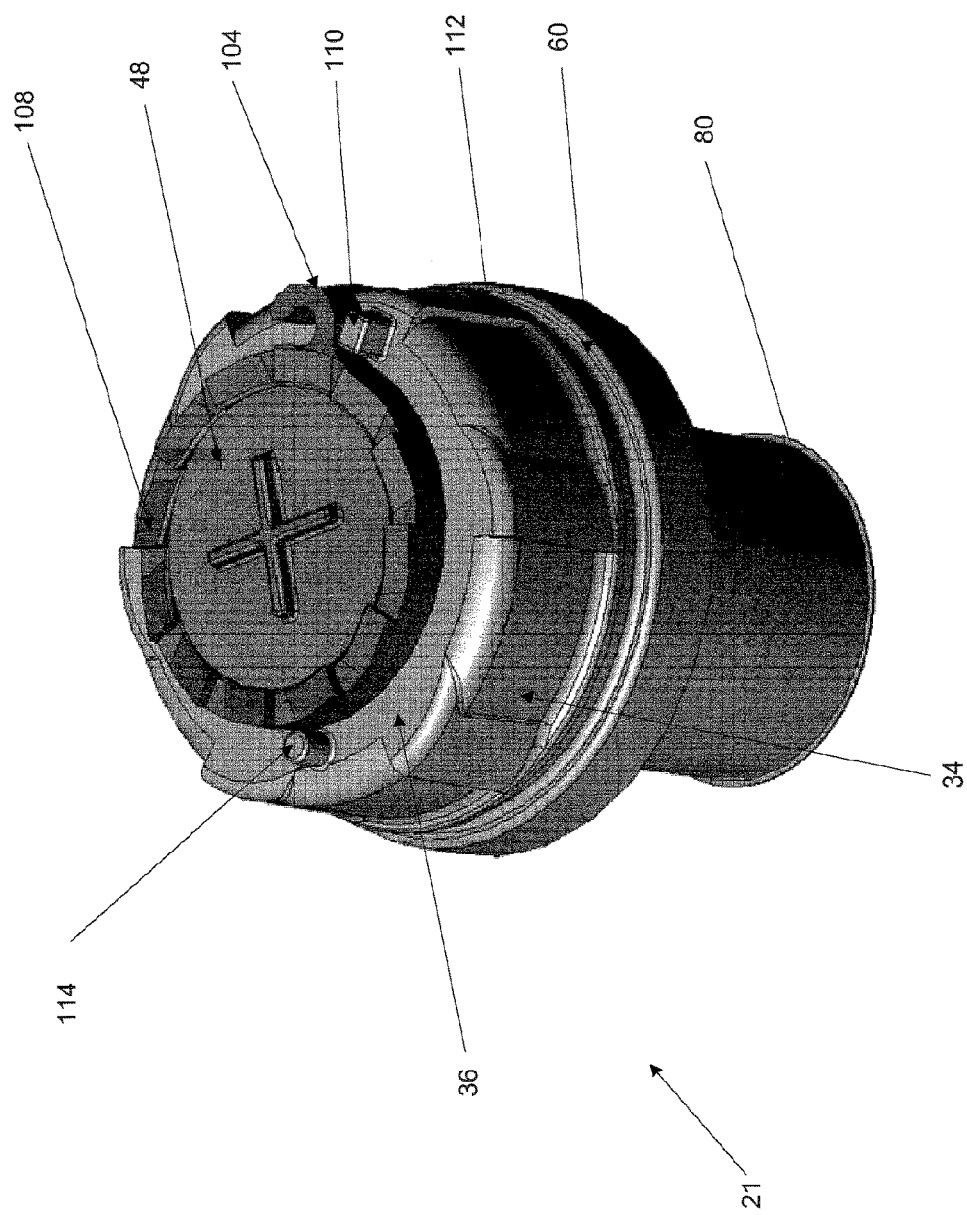

In the alternative embodiment depicted in FIGS. 7(a)-(c), the dispenser 10 is designed to dispense the material into the container while the consumer is screwing it on to the container in a clockwise direction, following which the consumer can unscrew the dispenser 10 in a counterclockwise direction after dispensing has occurred. The consumer may find this convenient when, for example, the dispenser 10 contains a refill cleaning product and the consumer is instructed to screw the dispenser 10 on to a container that contained the original cleaning product and that has since been refilled with water in anticipation of being mixed with the refill cleaning product. The embodiment shown in FIGS. 7(a)-(c) is discussed in more detail in U.S. provisional patent application 61/748,513, filed on Jan. 3, 2013, the entirety of which is hereby incorporated by reference herein.

FIG. 7(a) shows the cap portion 84 of the dispenser 10. The planar underside of the cap portion 84 has four pawls 100 that form part of a first one-way coupling. The curved inner side of the cap portion 84 has a series of spaced teeth 102 on it that form part of a second one-way coupling. When the dispenser 10 is being used, the cap portion 84 fits over the base 21 and the remainder of the rotatable portion 48 shown in FIG. 7(b). Unlike the embodiments of FIGS. 1 to 6, the rotatable portion 48 used in the embodiment of FIGS. 7(a)-(c) is separable into the cap portion 84 and the remainder of the rotatable portion 48, which fits within the protective cylinder 80. The remainder of the rotatable portion 48 sits on the rim 36 of the collar 34. Along the top of the periphery of the remainder of the rotatable portion 48 are a series of wedge-shaped teeth 108 that are positioned to contact the pawls 100 on the underside of the cap portion 84. The teeth 108 and pawls 100 collectively comprise the first one-way coupling in that the pawls 100 freely slide over the teeth 108 when the cap portion 84 is rotated counterclockwise but interlock with the teeth 108 when the cap portion 84 is rotated clockwise; consequently, the first one-way coupling permits the consumer to rotate the entire rotatable portion 48 clockwise but not counterclockwise. On the exterior of the curved surface of the collar 34 are a series of pawls 112 that are similarly positioned to contact the teeth 102 on the interior curved surface of the cap portion 84. These teeth 102 and pawls 112 collectively comprise the second one-way coupling in that the pawls 112 freely slide over the teeth 102 when the cap portion 84 is rotated clockwise but interlock with the teeth 102 when the cap portion 84 is rotated counterclockwise, thus permitting the consumer to rotate the entire base 21 counterclockwise but not clockwise.

The remainder of the rotatable portion 48 also includes a hook-shaped protrusion 104 that forms a compression fit around and in conjunction with a peg 114 extending upwardly from the rim 36 of the collar 34. Circumferentially spaced from the peg 114 along the rim 36 is a stopper 110 that also extends upwardly from the rim 36. The hook-shaped protrusion 104 and the peg 114 collectively comprise a hook/peg releasable coupling.

The dispenser 10 is delivered to the consumer with the hook-shaped protrusion 104 hooked around the peg 114 as shown in FIG. 7(b). When the consumer screws the dispenser 10 on to the container, the initial torque the consumer applies by rotating the cap portion 84 clockwise is transferred from the cap portion 84 to the base 21 via the first one-way coupling and the hook/peg releasable coupling until the base 21 is securely screwed on to the container. Once the base 21 is securely screwed on to the container, additional clockwise torque causes the hook-shaped protrusion 104 to detach from the peg 114 and to rotate clockwise until it hits the stopper 110. This clockwise rotation causes the storage compartment 16 to rotate, which results in the piercer 20 piercing the foil 22 and the material being dispensed into the container; the position of the base 21 and the remainder of the rotatable portion 48 when in this state is shown in FIG. 7(c). In the embodiment in which the material is refill cleaning product, the consumer will have dispensed the refill cleaning product into the container as a consequence of performing the intuitive action of screwing the dispenser 10 on to the container. Once the foil 22 has been torn open, the hook-shaped protrusion 104 hits the stopper, which prevents further clockwise rotation. Sensing this, the consumer then turns the cap portion 84 counterclockwise, which causes the base 21 to also turn counterclockwise by virtue of the second one-way coupling. This unscrews the dispenser 10 from the container. The consumer can subsequently screw on a different dispenser depending on the nature of the dispensed material and container; in the embodiment in which the dispensed material is refill cleaning product, for example, the consumer can screw on a spray nozzle to the container.

In the depicted embodiment, the portion of the storage compartment 16 and protective cylinder 80 that extends into the neck of the container is designed to have a volume that is at least as large as the volume of the storage compartment 16. Consequently, even if the container is completely filled with a liquid prior to inserting the dispenser 10, by virtue of the displacement of the liquid when the dispenser 10 is inserted into the container there will be sufficient space within the container to receive the material stored in the storage compartment 16.

The foregoing embodiments show the dispenser 10 comprising the pierceable membrane; in alternative embodiments (not depicted), an assembly for use in manufacturing a dispenser for dispensing material into a container is provided. In some of these alternative embodiments, the assembly is identical to the embodiments of the dispenser 10 described above, with the exception that the assembly does not comprise the pierceable membrane. The manufacturer of the assembly can ship the assembly to a distributor or wholesaler, which then fills the dispenser 10 with the material to be dispensed and affixes the pierceable membrane on to the dispenser 10 to hermetically seal the material within the dispenser 10.

It is contemplated that any part of any aspect or embodiment discussed in this specification can be implemented or combined with any part of any other aspect or embodiment discussed in this specification. For example, while FIGS. 7(a)-7(c) depict the rotatable portion 48 as comprising two discrete parts, in alternative embodiments (not depicted) the rotatable portion 48 as depicted in FIGS. 1-6 can be combined with the hook/peg releasable coupling of FIGS. 7(a)-(c).

While particular embodiments have been described in the foregoing, it is to be understood that other embodiments are possible and are intended to be included herein. It will be clear to any person skilled in the art that modifications of and adjustments to the foregoing embodiments, not shown, are possible.

The invention claimed is:

1. A dispenser for dispensing material into a container, the dispenser comprising:
    (a) a base couplable to the container, the base comprising a collar and a protective cylinder that extends downwardly from the collar, the collar having a rim along which a peg and a stopper are circumferentially spaced from each other, the peg and the stopper each extending upwardly from the rim of the collar;
    (b) a rotatable portion mounted to the base and rotatable about an axis of rotation, the rotatable portion comprising:

(i) a cap portion having an underside that rests on the rim of the base, the cap portion comprising a hook-shaped protrusion shaped and positioned to be releasably couplable to the peg on the base, wherein rotation of the rotatable portion actuates rotation of the hook-shaped protrusion to uncouple the hook-shaped protrusion from the peg and rotate the hook-shaped protrusion to the stopper; and (ii) a storage compartment for storing the material, the storage compartment comprising an inner hollow cylinder downwardly extending from the cap portion and sized to fit within the protective cylinder of the base, the inner hollow cylinder defining a dispensing aperture at the downwardly extending end, wherein the dispensing aperture is covered by a pierceable membrane sealed overtop of the dispensing aperture; and (c) a piercer situated at the downwardly extending end of the protective cylinder, the piercer positioned to pierce the pierceable membrane covering the dispensing aperture of the storage compartment during rotation of the rotatable portion between the peg and the stopper, wherein rotation between the peg and the stopper is sufficient to pierce the membrane and uncover the dispensing aperture such that the material stored in the storage compartment falls into the container.

2. The dispenser of claim 1, wherein the base is threaded for screwing on to a neck of the container and the storage compartment extends into the neck of the container.

3. The dispenser of claim 1, wherein the rotatable portion rotates without moving along the axis of rotation.

4. The dispenser of claim 1, wherein the inner hollow cylinder is sheathed within the protective cylinder.

5. The dispenser of claim 1, wherein the base further comprises a grid on the downwardly extending end of the protective cylinder to which the piercer is attached.

6. The dispenser of claim 1, wherein the downwardly extending end of the protective cylinder to which the piercer is attached extends past the downwardly extending end of the inner hollow cylinder.

7. The dispenser of claim 1, wherein the downwardly extending end of the inner hollow cylinder comprises a periphery that extends in a direction non-perpendicular relative to the axis of rotation and lies in a plane that is oblique relative to the axis of rotation.

8. The dispenser of claim 7, wherein the entire periphery lies in the plane that is oblique relative to the axis of rotation.

9. The dispenser of claim 7, wherein a first portion of the periphery lies in the plane that is oblique relative to the axis of rotation and a second portion of the periphery lies in a plane that is perpendicular to the axis of rotation.

10. The dispenser of claim 1, wherein the collar comprises an outer curved surface having a ridge and an inner curved surface of the cap portion has a slot sized to receive the ridge to position the rotatable portion and the base relative to each other during assembly of the dispenser, wherein the ridge and the slot are aligned parallel to the axis of rotation and positioned to avoid interfering with each other during rotation of the cap portion.

11. The dispenser of claim 10, wherein the inner curved surface of the cap portion further comprises a stopper positioned to interfere with the ridge on the outer curved surface of the collar during rotation of the cap portion after the piercer has pierced the membrane.

12. The dispenser of claim 10, wherein one of the rim and the cap portion comprises a dimple and the other of the rim and the cap portion comprises a bump inserted into the dimple, wherein the bump and the dimple resist rotation of the cap portion and are aligned with the ridge and the slot.

13. The dispenser of claim 10, wherein the outer curved surface of the collar comprises a first flange that interlocks with a corresponding second flange protruding from the inner curved surface of the cap portion when the rotatable portion is mounted on the base, wherein interlocking of the corresponding flanges prevents relative motion of the cap portion and the collar along the axis of rotation.

14. A dispenser for dispensing material into a container, the dispenser comprising:

(a) a base, screwable on to a neck of the container, comprising:

(i) a collar having a rim along which a peg and a stopper are circumferentially spaced from each other, the peg and the stopper each extending upwardly from the rim of the collar;

(ii) a protective cylinder that extends downwardly from the collar into the neck of the container when the dispenser is screwed on to the container;

(iii) a piercer located along a periphery of an end of the protective cylinder that is closest to a bottom end of the container when the dispenser is screwed onto the container; and (b) a rotatable portion mounted to the base and rotatable about an axis of rotation, the rotatable portion comprising:

(i) a cap portion having an underside that rests on the rim of the base, the cap portion comprising a hook-shaped protrusion shaped and positioned to be releasably couplable to the peg on the base, wherein rotation of the rotatable portion actuates rotation of the hook-shaped protrusion to uncouple the hook-shaped protrusion from the peg and rotate the hook-shaped protrusion to the stopper;

(ii) a storage compartment for storing the material, the storage compartment comprising:

(1) an inner hollow cylinder downwardly extending from the cap portion and sheathed by the protective cylinder;

(2) a dispensing aperture delineated by a periphery of an end of the inner hollow cylinder that is closest to the bottom end of the container when the dispenser is screwed on to the container, wherein the periphery of the end of the inner hollow cylinder lies in one plane that is perpendicular to the axis of rotation and another plane that is oblique relative to the axis of rotation; and (iii) a pierceable membrane sealed along the periphery of the end of the inner hollow cylinder, wherein the piercer is adjacent a portion of the membrane that is oblique relative to the axis of rotation;

wherein the piercer pierces the pierceable membrane during rotation of the rotatable portion between the peg and the stopper to allow the material stored in the storage compartment to fall into the container.

15. The dispenser of claim 14, wherein the base further comprises a grid on the end of the protective cylinder that is closest to the bottom end of the container when the dispenser is screwed onto the container, wherein the piercer is attached to the grid.

16. The dispenser of claim 14, wherein the collar comprises an outer curved surface having a ridge and an inner curved surface of the cap portion has a slot sized to receive the ridge to position the rotatable portion and the base relative to each other during assembly of the dispenser, wherein the ridge and the slot are aligned parallel to the axis of rotation and positioned to avoid interfering with each other during rotation of the cap portion.

17. The dispenser of claim 16, wherein the inner curved surface of the cap portion further comprises a stopper positioned to interfere with the ridge on the outer curved surface of the collar during rotation of the cap portion after the piercer has pierced the membrane.

18. The dispenser of claim 16, wherein one of the rim and the cap portion comprises a dimple and the other of the rim and the cap portion comprises a bump inserted into the dimple, wherein the bump and the dimple resist rotation of the cap portion and are aligned with the ridge and the slot.

19. The dispenser of claim 16, wherein the outer curved surface of the collar comprises a first flange that interlocks with a corresponding second flange protruding from the inner curved surface of the cap portion when the rotatable portion is mounted on the base, wherein interlocking of the corresponding flanges prevents relative motion of the cap portion and the collar along the axis of rotation.

20. An assembly for use in manufacturing a dispenser for dispensing material into a container, the assembly comprising:
   (a) a base, couplable to the container, comprising a collar and a protective cylinder that extends downwardly from the collar onto which is mounted a piercer, the collar having a rim along which a peg and a stopper are circumferentially spaced from each other, the peg and the stopper each extending upwardly from the rim of the collar; and
   (b) a rotatable portion mounted to the base and rotatable about an axis of rotation, the rotatable portion comprising:
      (i) a cap portion having an underside that rests on the rim of the base, the cap portion comprising a hook-shaped protrusion shaped and positioned to be releasably couplable to the peg on the base, wherein rotation of the cap portion actuates rotation of the hook-shaped protrusion to uncouple the hook-shaped protrusion from the peg and rotate the hook-shaped protrusion to the stopper;
      (ii) a storage compartment for storing the material, the storage compartment downwardly extending from the cap portion and having a periphery that defines a dispensing aperture that is covered by a pierceable membrane sealed along the periphery of the storage compartment, at least a portion of the periphery extending in a direction non-perpendicular relative to the axis of rotation, wherein the dispensing aperture is uncovered to allow the material stored in the storage compartment to fall into the container when the piercer is positioned to pierce the membrane from the outside of the storage compartment during a full rotation of the rotatable portion between the peg and the stopper.

* * * * *